US009754686B2

(12) United States Patent
Jarboe et al.

(10) Patent No.: US 9,754,686 B2
(45) Date of Patent: Sep. 5, 2017

(54) PLASMA CONFINEMENT SYSTEM AND METHODS FOR USE

(71) Applicant: University of Washington through its Center for Commercialization, Seattle, WA (US)

(72) Inventors: Thomas R. Jarboe, Bellevue, WA (US); Derek Sutherland, Seattle, WA (US)

(73) Assignee: University of Washington Through Its Center For Commercialization, Seattle, WA (US)

( * ) Notice: Subject to any disclaimer, the term of this patent is extended or adjusted under 35 U.S.C. 154(b) by 513 days.

(21) Appl. No.: 14/461,821

(22) Filed: Aug. 18, 2014

(65) Prior Publication Data
US 2015/0055739 A1    Feb. 26, 2015

Related U.S. Application Data

(60) Provisional application No. 61/867,958, filed on Aug. 20, 2013.

(51) Int. Cl.
| | |
|---|---|
| *G21B 1/17* | (2006.01) |
| *G21B 1/05* | (2006.01) |
| *G21B 1/11* | (2006.01) |

(52) U.S. Cl.
CPC ............. *G21B 1/11* (2013.01); *G21B 1/05* (2013.01); *G21B 1/17* (2013.01); *Y02E 30/126* (2013.01)

(58) Field of Classification Search
USPC ........................................................ 376/150
See application file for complete search history.

(56) References Cited

U.S. PATENT DOCUMENTS

| 5,147,596 A | 9/1992 | Weil | |
|---|---|---|---|
| 2014/0321587 A1* | 10/2014 | Jarboe | ............ G21B 1/05 376/133 |
| 2015/0055739 A1 | 2/2015 | Jarboe et al. | |

FOREIGN PATENT DOCUMENTS

WO    2013106130    7/2013

OTHER PUBLICATIONS

Rice, et al., "Inter-machine comparison of intrinsic toroidal rotation in tokamaks," Nuclear Fusion, vol. 47, No. 11, pp. 1618-1624, 2007.
(Continued)

*Primary Examiner* — Sean P Burke
(74) *Attorney, Agent, or Firm* — McDonnell Boehnen Hulbert & Berghoff LLP

(57) ABSTRACT

A plasma confinement system is provided that includes a confinement chamber that includes one or more enclosures of respective helicity injectors. The one or more enclosures are coupled to ports at an outer radius of the confinement chamber. The system further includes one or more conductive coils aligned substantially parallel to the one or more enclosures and a further set of one or more conductive coils respectively surrounding portions of the one or more enclosures. Currents may be provided to the sets of conductive coils to energize a gas within the confinement chamber into a plasma. Further, a heat-exchange system is provided that includes an inner wall, an intermediate wall, an outer wall, and pipe sections configured to carry coolant through cavities formed by the walls.

8 Claims, 11 Drawing Sheets

(56) References Cited

OTHER PUBLICATIONS

Sarff, et al., "Tokamak-like confinement at a high beta and low toroidal field in the MST reversed field pinch," Nuclear Fusion, vol. 43, No. 12, pp. 1684-1692, 2003.
Sborchia, "ITER Superconducting Magnets," Lecture of Fusion Reactor Engineering, Politecnico of Turin, 86 pp, 2011.
Schlissel, et al., "Coal-Fire Power Plant Construction Costs," Synapse Energy Economics Inc., Cambridge, MA, 8 pp., available online at: www.synapse-energy.com, 2008.
Schlissel, et al., "Nuclear Power Plant Construction Costs," Synapse Energy Economics Inc., Cambridge, MA, 9 pp., available online at: www.synapse-energy.com, 2008.
Sieck, et al., "Demonstration of steady inductive helicity injection," Nuclear Fusion, 46(2):254-261, 2006.
Sutherland, et al., "The Dynomak: An advanced spheromak reactor concept with imposed-dynamo current drive and next-generation nuclear power technologies," Fusion Engineering and Design, vol. 89, No. 4, pp. 412-425, 2014.
U.S. Energy Information Administration, "Updated Capital Cost Estimates for Electricity Generation Plants," vol. 189 pp, 2010.
Victor, et al., "Advances in Steady Inductive Helicity Injection for Plasma Startup and Toroidal Current Drive," 25 pp., available online at: http://www.sunist.org/shared%20documents/ISTW2011/Victor.pdf, 2011.
Victor, et al., "Evidence for separatrix formation and sustainment with steady inductive helicity injection," Physical Review Letters, vol. 107, No. 16, 165005, 2011.
Victor, et al., "Sustained spheromaks with ideal n=1 kink stability and pressure confinement," Physics of Plasmas, vol. 21, No. 8, 082504(epub Aug. 2014).
Wallin, "Alumina thin films from computer calculations to cutting tools," Ph.D. Thesis, Linköping University: Institute of Technology, Dissertation No. 1221, 75 pp, 2008.
Wesson, "Instabilities," in Tokamaks, Clarendon Press, Oxford, pp. 166-167, 178-181, 1987.
Willett, et al., "The internal magnetic structure and current drive in the SPHEX spheromak," Plasma Physics and Controlled Fusion, vol. 41, No. 5, pp. 595-612, 1999.
Wolf, "Internal transport barriers in tokamak plasmas," Plasma Physics and Controlled Fusion, vol. 45, No. 1, pp. R1-R91, 2002.
Wrobel, "A study of HIT-SI plasma dynamics using surface magnetic field measurements," Ph.D. Thesis, University of Washington, 399 pp, 2011.
Wysocki, et al., "Evidence for a Pressure-Driven Instability in the CTX Spheromak," Physical Review Letters, vol. 61, No. 21, pp. 2457-2460, 1988.
Wykes, "ITER the way to fusion Energy" May 2006.
Xu, et al., "Angular dependence of Jc for YBCO coated conductors at low temperature and very high magnetic fields," Superconductor Science and Technology, vol. 23, No. 1, 014003, 2009.
Yamada, et al., "Investigation of confinement properties of spheromak," International Atomic Energy Agency (IAEA) 12th International Conference on Plasma Physics, Paper No. IAEA-CN-50/C-IV-3, pp. 539-555, 1998.
Youssef, "Damage Rate in V.V. as a Function of Convective Layer Thickness," APEX Study Memorandum, 10 pp, 1998.
Zinkle, "Operating temperature windows for fusion reactor structural materials," Fusion Engineering and Design, vol. 51-52, pp. 55-71, 2000.
American Superconductor Corporation, "Scale-up of Second Generation HTS Wire (2G-YBCO Coated Conductor)," DOE Peer Review: AMSC 2G Scale-up, 62 pp, 2004.
Bellan, "4.4.1 Equality of poloidal and toroidal field energies in an isolated axisymmetric spheromak," in Spheromaks, London: Imperial College Press, pp. 76-77, 2000.
Black, et al., "Cost and Performance Baseline for Fossil Energy Plants, vol. 1: Bituminous Coal and Natural Gas to Electricity, Revision 2," National Energy Technology Laboratory, Report No. DOE/2010/1397, vol. 626 pp, 2011.
Boozer, "Power requirements for current drive," Physics of Fluids, vol. 31, No. 3, pp. 591-595, 1988.
Bromberg, et al., "Options for the use of high temperature superconductor in tokamak fusion reactor designs," Fusion Engineering and Design, vol. 54, No. 2, pp. 167-180, 2001.
Calderoni, et al., "Control of molten salt corrosion of fusion structural materials by metallic beryllium," Journal of Nuclear Materials, vol. 386-388, No. 1102-1106, 2009.
Callen, et al., "Resonant magnetic perturbation effects on pedestal structure and ELMs," Nuclear Fusion, vol. 52, No. 11, 114005, 2012.
Connor, et al., "A review of internal transport barrier physics for steady-state operation of tokamaks," Nuclear Fusion, vol. 44, No. 4, pp. R1-R49, 2004.
Dahlgren, et al., "ARIES-AT magnet systems," Fusion Engineering and Design, vol. 80, No. 1-4, pp. 139-160, 2006.
Dostal, "A Supercritical Carbon Dioxide Cycle for Next Generation Nuclear Reactors," Ph.D. Thesis, MIT Department of Nuclear Science and Engineering, 317 pp, 2004.
Ennis, et al., "New understandings and achievements from independent-injector drive experiments on HIT-SI," Nuclear Fusion, vol. 50, No. 7, 072001, 2010.
Fisch, "Theory of current drive in plasmas," Reviews of Modern Physics, vol. 59, No. 1, pp. 175-234, 1987.
Forty, et al., "Handbook of Fusion Activation Data: Part 1, Elements Hydrogen to Zirconium," No. AEA FUS 180, 17 pp., 1992.
Fowler, "Theoretical Aspects of Energy Confinement in Spheromaks," Fusion Science and Technology, vol. 29, No. 2, pp. 206-209, 1996.
Fowler, et al., "On the Possibility of Ohmic Ignition in a Spheromak," Comments in Plasma Physics and Controlled Fusion, vol. 16, No. 2, pp. 91-104, 1994.
Zohm, "On the Minimum Size of Demo," Fusion Science and Technology, vol. 58, No. 2, pp. 613-624, 2010.
Hagenson, et al., "Steady-State Spheromak Reactor Studies," Fusion Science and Technology, vol. 8, No. 1P2B, pp. 1606-1612, 1985.
Hamp, et al., "Temperature and density characteristics of the Helicity Injected Torus-II spherical tokamak indicating closed flux sustainment using coaxial helicity injection," Physics of Plasmas, vol. 15, No. 8, 082501, epub Aug. 2008.
Hayashi, et al., "Advanced neutron shielding material using zirconium borohydride and zirconium hydride," Journal of Nuclear Materials, vol. 386-388, No. 119-121, 2009.
Hejzlar, et al., "Assessment of gas cooled fast reactor with indirect supercritical CO2 cycle," Nuclear Engineering and Technology, vol. 38, No. 2, pp. 109-118, 2006.
Hooper, et al., "A Re-Examination of Spheromak Experiments and Opportunities," Fusion Science and Technology, vol. 29, No. 2, pp. 191-205, 1996.
Hooper, et al., "Reactor Opportunities for the Spheromak," Current Trends in International Fusion Research: A Review, Washington, DC, submitted Mar. 24-28, 11 pp, 2003.
Hooper, et al., "Sustained Spheromak Physics Experiment," Proceedings of the 17th International Conference on Fusion Energy 1998, Yokohama, Japan, CD-ROM File No. ICP/04, 1998.
Hudson, et al., "Energy confinement and magnetic field generation in the SSPX spheromak," Physics of Plasmas, vol. 15, No. 5, :056112, epub Mar. 2008.
International Search Report and Written Opinion dated Aug. 7, 2013 for PCT/US2012/065031.
Jarboe, "Imposed Dynamo Current Drive," 2013 EPR Meeting, 23 pp., available online at: http://www.iccworkshops.org/epr2013/uploads/165/epr4talk2013.pdf., 2013.
Jarboe, "Review of spheromak research," Plasma Physics and Controlled Fusion, vol. 36, No. 6, pp. 945-990, 1994.
Jarboe, "The spheromak confinement device," Physics of Plasmas, vol. 12, No. 5, 058103, epub May 2005.
Jarboe, et al., "A model for the loop voltage of reversed field pinches," Physics of Fluids, vol. 30, No. 4, pp. 1177-1179, 1987.
Jarboe, et al., "Imposed-dynamo current drive," Nuclear Fusion, vol. 52, No. 8, 083017, 9 pp, 2012.

(56) References Cited

OTHER PUBLICATIONS

Jarboe, et al., "Progress with energy confinement time in the CTX spheromak," Physics of Fluids B, vol. 2, No. 6, pp. 1342-1346, 1990.
Jarboe, et al., "Recent results from the HIT-SI experiment," Nuclear Fusion, vol. 51, No. 6, 063029, 2011.
Jarboe, et al., "Spheromak Formation by Steady Inductive Helicity Injection," Physical Review Letters, vol. 97, No. 11, 115003, 2006.
Ji, et al., "Time-Resolved Observation of Discrete and Continuous Magnetohydrodynamic Dynamo in the Reversed-Field Pinch Edge," Physical Review Letters, vol. 73, No. 5, pp. 668-671, 1994.
Klueh, et al., "A potential new ferritic/martensitic steel for fusion applications," Journal of Nuclear Materials, vol. 283-287, Pt 1, pp. 697-701, 2000.
Kumar, et al., "Classical Impurity Ion Confinement in a Toroidal Magnetized Fusion Plasma," Physical Review Letters, vol. 108, pp. 125006, 2012.
Ludington, "Tools for Supercritical Carbon Dioxide Cycle Analysis and the Cycle's Applicability to Sodium Fast Reactors," Master Thesis, MIT Department of Nuclear Science and Engineering, 153 pp, 2009.
Matbase.com "[Data table] Zirconium dioxide [ZrO2-Y2O3 stabilized]," available online at: https://www.matbase.com/material-categories/ceramics-and-glasses/crystalline/technical/zirconium-dioxides/material-properties-of-zirconium-dioxide-yttrium-oxide-stabilized-zro2-y2o3.html, 2012.
McCarthy, et al., "Flibe Assessment Summary," APEX Meeting Presentation, vol. 46, pp, 1998.
McCollam, "Magnetic relaxation in coaxial helicity injection," Plasma Physics and Controlled Fusion, vol. 44, No. 5, pp. 493-517, 2002.
Menard, et al., "Prospects for pilot plants based on the tokamak, spherical tokamak, and stellarator," Nuclear Fusion, vol. 51, No. 10, 103014, 2011.
Muhsin, "Chemical Vapor Deposition of Aluminum Oxide ((Al2O3)) and Beta Iron Disilicide ($\beta$FeSi2) Thin Films," Ph.D. Thesis, University of Duisburg-Essen, 141 pp., 2007.
Mylavarapu, et al., "Investigation of high-temperature printed circuit heat exchangers for very high temperature reactors," Journal of Engineering for Gas Turbines and Power, vol. 131, No. 6, 062905, 2009.
Nagasaka, et al., "Progress in Flibe Corrosion Study towards Material Research Loop and Advanced Liquid Breeder Blanket," in IAEA FEC Proceedings, Paper FT/P2-4, 8 pp., 2008.
Najmabadi and the ARIES Team, "The ARIES-AT advanced tokamak, Advanced technology fusion power plant," Fusion Engineering and Design, vol. 80, No. 1-4, pp. 3-23, 2006.
Najmabadi, et al., "The ARIES-CS Compact Stellarator Fusion Power Plant," Fusion Science and Technology, vol. 54, No. 3, pp. 655-672, 2008.
O'Neill, et al., "A fully relaxed helicity balance model for an inductively driven spheromak," Physics of Plasmas, vol. 14, No. 11, 112304, epub Nov. 2007.
Porter, et al., "Analysis of separatrix plasma parameters using local and multi-machine databases," Journal of Nuclear Materials, vol. 266-269, No. 917-921, 1999.
Raman, et al., "Demonstration of Tokamak Ohmic Flux Saving by Transient Coaxial Helicity Injection in the National Spherical Torus Experiment," Physical Review Letters, vol. 104, 095003, 2010.
Redd, et al., "Flux amplification in Helicity Injected Torus (HIT-II) coaxial helicity injection discharges," Physics of Plasmas, vol. 15, No. 2, 022506, epub Feb. 2008.

* cited by examiner

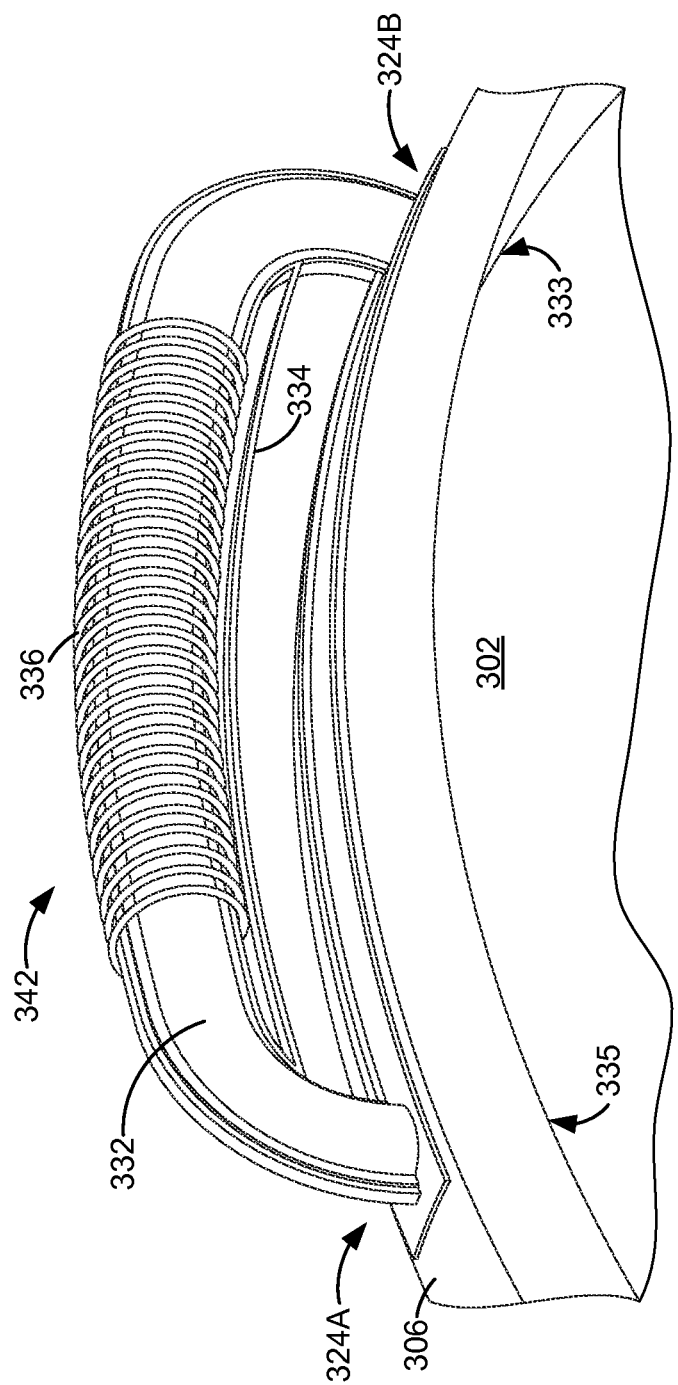

PLASMA CONFINEMENT SYSTEM AND METHODS FOR USE

CROSS-REFERENCE TO RELATED APPLICATIONS

This application claims the benefit of U.S. Provisional Patent Application No. 61/867,958, filed Aug. 20, 2013, the contents of which are incorporated herein by reference in their entirety.

STATEMENT REGARDING FEDERALLY SPONSORED RESEARCH OR DEVELOPMENT

This invention was made with government support under DE-FG02-96ER54361 awarded by the Department of Energy. The government has certain rights in the invention.

BACKGROUND

Unless otherwise indicated herein, the materials described in this section are not prior art to the claims in this application and are not admitted to be prior art by inclusion in this section.

Nuclear fusion is the process of combining two nuclei. When two nuclei of elements with atomic numbers less than that of iron are fused, energy is released. The release of energy is due to a slight difference in mass between the reactants and the products of the fusion reaction and is governed by $\Delta E = \Delta mc^2$. The release of energy is also dependent upon the difference between the attractive strong nuclear force between the reactant nuclei and the repulsive electrostatic force between electron clouds of the reactant atoms.

The fusion reaction requiring the lowest plasma temperature occurs between deuterium (a hydrogen atom having a nucleus with one proton and one neutron) and tritium (a hydrogen atom having one proton and two neutrons). This reaction yields a helium-4 atom and a neutron.

One approach for achieving thermonuclear fusion is to energize a gas containing fusion reactants inside a reactor chamber. The energized gas becomes a plasma upon becoming ionized. To achieve conditions with sufficient temperatures and densities for fusion the plasma needs to be confined.

SUMMARY

In one example, a plasma confinement system is provided that includes a confinement chamber comprising one or more ports located at an outer radius of the confinement chamber. The system further includes one or more enclosures aligned substantially parallel to the outer radius and each coupled to a respective first port of the one or more ports at a first end of the enclosure and coupled to a respective second port of the one or more ports at a second end of the enclosure. The system further includes a first set of one or more conductive coils respectively located between each of the one or more enclosures and the confinement chamber. The first set of one or more conductive coils are aligned substantially parallel with the one or more enclosures. The system further includes a second set of one or more conductive coils respectively surrounding a portion of each of the one or more enclosures.

In another example, a method is provided that includes inserting a gas into a confinement chamber and providing respective currents to at least two conductive coils of at least one helicity injector. The at least one helicity injector is coupled to the confinement chamber at an outer radius of the confinement chamber. The method further includes energizing at least a portion of the gas into a plasma, thereby inducing toroidal and poloidal plasma currents within the plasma. The method further includes confining the plasma within a substantially circular poloidal cross section by providing respective currents to at least one conductor that is (i) external to the confinement chamber, (ii) aligned substantially parallel to the outer radius, and (iii) centered upon a vertical axis of the confinement chamber that is perpendicular to the outer radius.

In yet another example, a system is provided that includes means for inserting a gas into the confinement chamber and means for providing respective currents to at least two conductive coils of at least one helicity injector. The at least one helicity injector is coupled to the confinement chamber at an outer radius of the confinement chamber. The system further includes means for energizing at least a portion of the gas into a plasma, thereby inducing toroidal and poloidal plasma currents within the plasma. The system further includes means for confining the plasma within a substantially circular poloidal cross section by providing respective currents to at least one conductor that is (i) external to the confinement chamber, (ii) aligned substantially parallel to the outer radius, and (iii) centered upon a vertical axis of the confinement chamber that is perpendicular to the outer radius.

In yet another example, a heat-exchange system is provided that includes an inner wall and an intermediate wall surrounding the inner wall to form an inner cavity between the inner wall and the intermediate wall. The system further includes an outer wall surrounding the intermediate wall to form an outer cavity between the intermediate wall and the outer wall. The system further includes a first pipe section coupled to the outer cavity at a first end of the first pipe, and a second pipe section coupled to a second end of the first pipe section at a first end of the second pipe section. The second pipe section contacts the inner wall. The system further includes a third pipe section coupled to a second end of the second pipe section at a first end of the third pipe section. The third pipe section is coupled to the inner cavity at a second end of the third pipe section. The system further includes an outlet pipe coupled to the inner cavity.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 3 shows an example helicity injector.

DETAILED DESCRIPTION

Within this disclosure, the term "substantially" means that the recited characteristic, parameter, or value need not be achieved exactly, but that deviations or variations, including for example, tolerances, measurement error, measurement accuracy limitations and other factors known to those of ordinary skill in the art, may occur in amounts that do not preclude the effect the characteristic was intended to provide.

Figure 1:
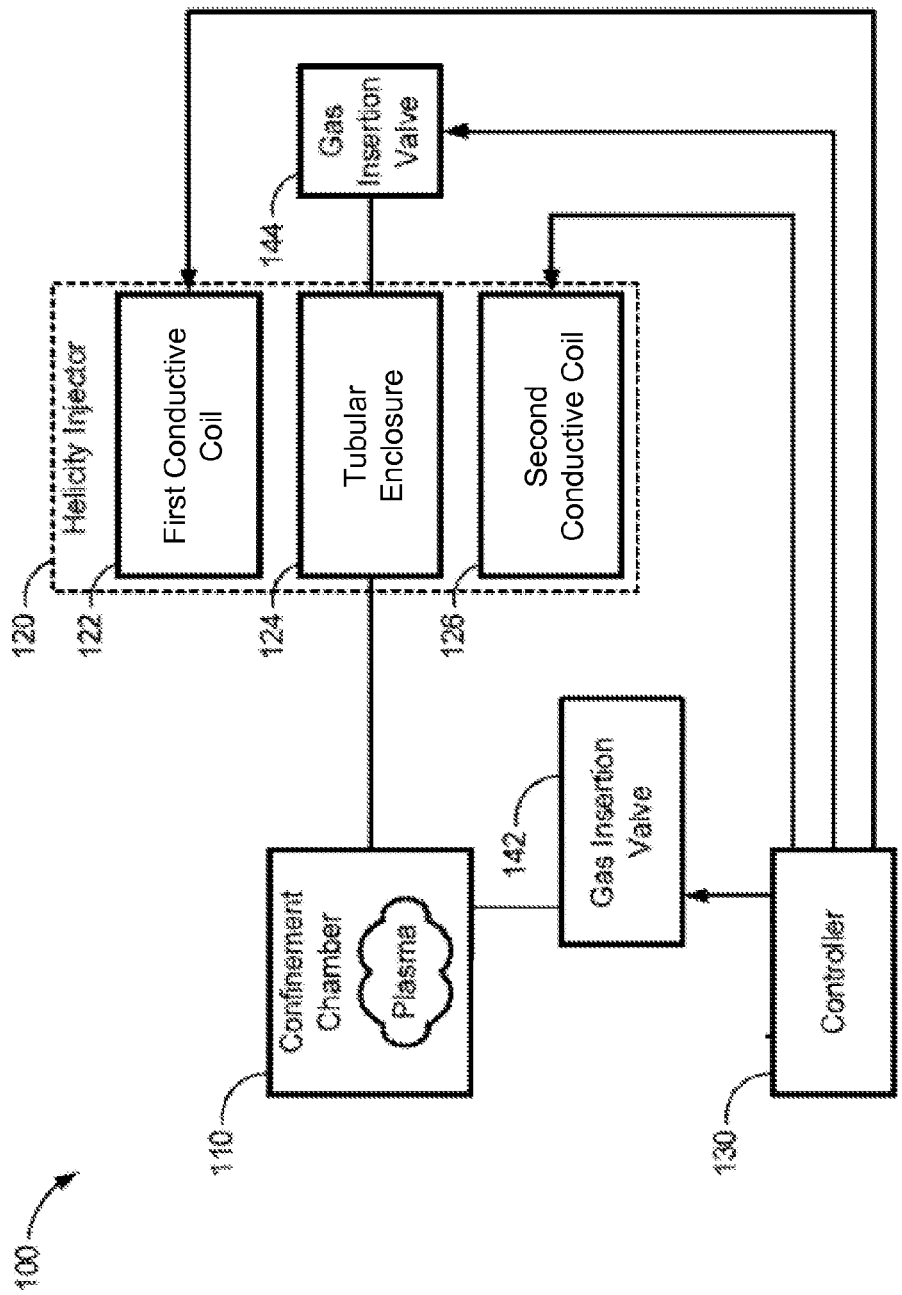
FIG. 1 is a functional block diagram of an example plasma confinement system.

FIG. 1 is a functional block diagram of a plasma confinement system 100. The plasma confinement system 100 may include a confinement chamber 110, a helicity injector 120, a controller 130, and gas insertion valves 142 and 144.

Figure 2A:
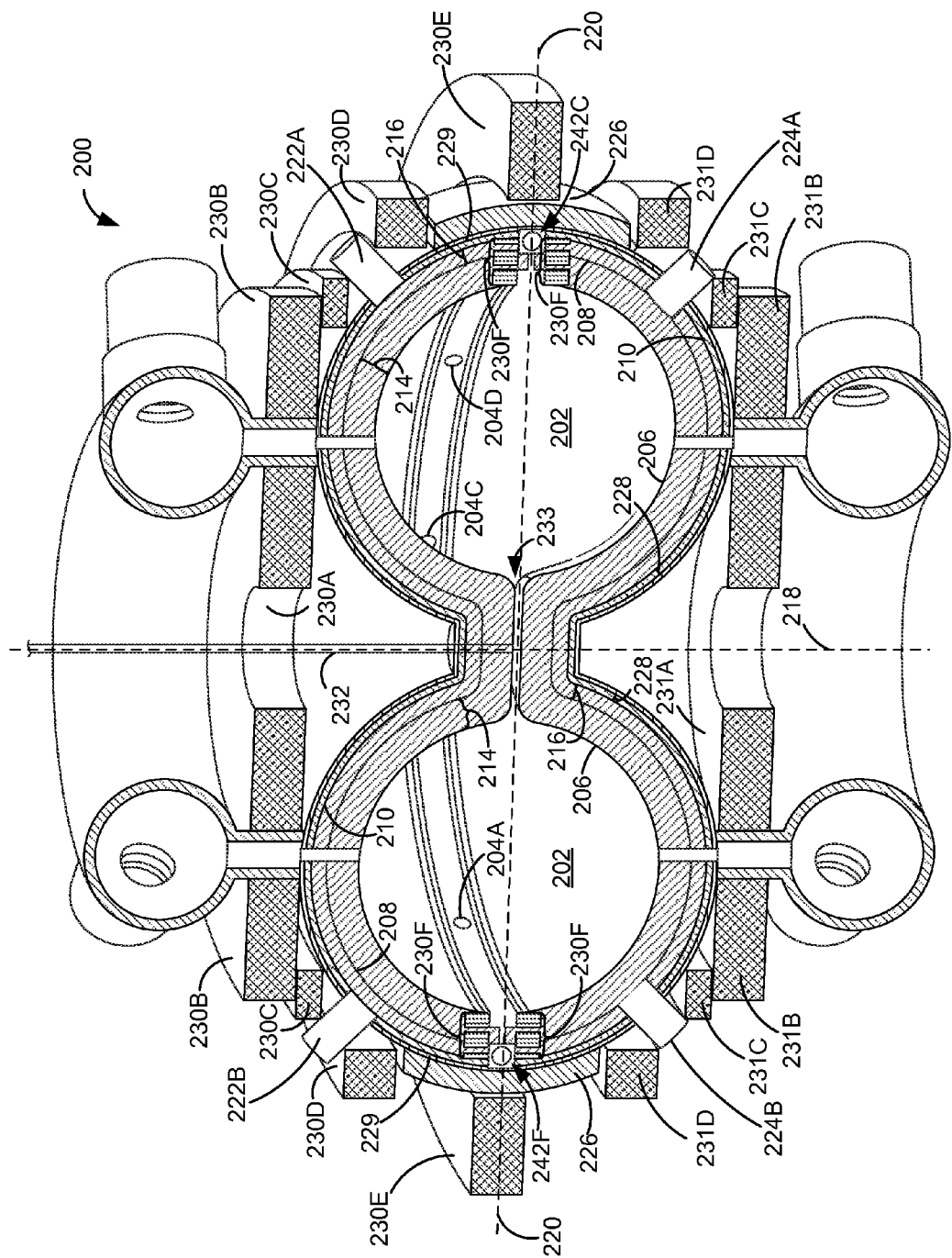
FIG. 2A is a side view cross-section of an example plasma confinement system.

The confinement chamber 110 may confine an ionized gas (i.e., plasma) with an inner wall at least partially formed of copper. In some examples, the confinement chamber 110 may have a torus shape (as shown in FIG. 2A). The inner wall of the confinement chamber 110 may be coated with an electrically insulating material to prevent current flow (e.g., discharge) between the inner wall and the confined plasma. For example, a ceramic material, such as alumina, may be spray-coated upon the inner wall.

The helicity injector 120 may include a first conductive coil 122, a tubular enclosure 124, and a second conductive coil 126. The tubular enclosure 124 may be in fluid connection (i.e., fluidly coupled) with the confinement chamber 110. For example, the tubular enclosure 124 may be a curved tube with first and second ends of the curved tube sealed to corresponding ports of the inner wall of the confinement chamber 110. In some examples, the tubular enclosure 124 may be 180 degrees of a torus (e.g., a half-torus). The tubular enclosure 124 may be formed of a conductive material such as a copper chromium alloy to confine magnetic flux within the helicity injector, similar to the inner wall of the confinement chamber 110. An inner surface of the tubular enclosure 124 may be coated with an electrically insulating material, such as alumina, to prevent current transfer (e.g., discharge) between the tubular enclosure 124 and any plasma that may pass through the tubular enclosure 124. In some examples, the plasma confinement system 100 may include one or more helicity injectors 120.

The first conductive coil 122 may be arranged between the tubular enclosure 124 and the confinement chamber 110 to carry a current that induces an electric field directed substantially parallel to longitudinal axis of the tubular enclosure 124. The electric field may induce a plasma current that flows through the tubular enclosure 124 substantially parallel to the longitudinal axis.

The second conductive coil 126 may be wrapped around the tubular enclosure 124 or otherwise arranged to carry a current that induces a magnetic field also directed substantially parallel to the longitudinal axis of the tubular enclosure 124. When the first conductive coil 122 and the second conductive coil 126 are provided currents simultaneously, charge carriers of the plasma may move along electric field lines induced by the first conductive coil 122 while revolving around magnetic field lines induced by the second conductive coil 126.

The plasma confinement system 100 may be operated using a controller 130. The controller 130 can include one or more control systems implemented in software and/or hardware to operate components of the plasma confinement system 100 to achieve functions described herein. Additionally or alternatively, one or more features can be achieved through components such as application specific integrated circuits, field programmable gate arrays, etc. Thus, the controller 130 described herein can be implemented through a variety of hardware and/or software modules operating to achieve the described functionality.

For example, the controller 130 may include a processor executing program instructions stored in a memory to generate currents that are respectively provided to the first conductive coil 122 and the second conductive coil 126. In some embodiments, the controller 130 is configured to provide respective currents to the first conductive coil 122 and the second conductive coil 126 that are in phase or out of phase. In some instances, the controller 130 may include a power supply system or may provide control signals to a power supply system for delivering suitable time-varying currents and/or voltages to the first conductive coil 122 and the second conductive coil 126 of the helicity injector 120.

The controller 130 may also provide respective control signals to the gas insertion valves 142 and 144 in order to insert a working gas into the confinement chamber 110 or the helicity injector 120. The working gas may include a combination of fusion reactants, such as atomic hydrogen, deuterium, tritium, or helium.

FIG. 2A is a side view cross-section of an example plasma confinement system 200. FIG. 2A also includes a plasma confinement chamber 202, ports 204A, 204C, and 204D, an inner wall 206, an intermediate wall 208, an outer wall 210, an inner cavity 214, an outer cavity 216, a vertical axis 218, a horizontal axis 220, inlet pipes 222A and 222B, outlet pipes 224A and 224B, a neutron shield 226, a neutron shielding layer 228, a structural shell 229, conductors 230A, 230B, 230C, 230D, 230E, 230F, 231D, 231C, 231B, and 231A, gas inlet pipe(s) 232, a center area 233, and helicity injectors 242F and 242C.

The confinement chamber 202 may be a torus-shaped confinement chamber configured to maintain a pressure differential between the confinement chamber 202 and a surrounding ambient atmosphere. (In other examples, the confinement chamber may be formed into shapes other than a torus.) The confinement chamber 202 may be defined, at least in part, by the inner wall 206. The confinement chamber 202 may include the ports 204A, 204C, and 204D (among other ports not shown in FIG. 2A) located at an outer radius of the confinement chamber 202. The outer radius may be located at a distal portion of the inner wall 206 within a plane that (i) includes the horizontal axis 220 and (ii) is perpendicular to the vertical axis 218.

The ports 204C and 204D may form respective interfaces at the inner wall 206 for coupling the confinement chamber 202 to first and second ends of a tubular enclosure of a helicity injector. (At least portions of example helicity injectors are shown in detail at FIGS. 2B, 3, 5A, 5B, and 8). In this way, the helicity injector may be coupled to the confinement chamber 202 so that a tubular enclosure of the helicity injector forms a continuous volume with the confinement chamber 202, thereby sealing the confinement chamber 202 to maintain a pressure differential between the confinement chamber 202 and the surrounding ambient atmosphere. The port 204A and an additional port (not shown in FIG. 2A) may similarly form respective interfaces at the inner wall 206 for an additional helicity injector to be coupled with the confinement chamber 202 at respective first and second ends of a tubular enclosure of the additional helicity injector. In one example, the confinement chamber 202 may include additional ports (not shown) for a total of twelve ports corresponding to six helicity injectors. (See FIG. 2B).

The inner wall 206 may define, at least in part, an interior boundary of the torus-shaped confinement chamber 202 and may include a copper flux conserving wall with a thickness of approximately 1 cm (although other thicknesses are possible). An interior surface of the inner wall 206 (e.g., the copper flux conserving wall) may be coated with an electrically insulating alumina layer but may otherwise be made up of a highly electrically conducting shell that may enhance the stability of a plasma within the confinement chamber 202. Also, the inner wall 206 may be highly thermally conductive so that heat generated by the plasma may be efficiently removed from the confinement chamber 202 via a heat-exchange system of the plasma confinement system (see FIGS. 6 and 7).

The intermediate wall 208 may also be torus-shaped and include a 316 stainless steel shell with thickness of approximately 2 cm (although other thicknesses are possible). The intermediate wall 208 may surround the inner wall 206 to form an inner cavity 214 which may also be referred to as a "hot blanket" because the inner cavity 214 may contain FLiBe coolant that receives heat generated by the plasma and transferred through the inner wall 206. The FLiBe coolant may comprise a molten salt eutectic that includes $BeF_2$ and LiF.

The outer wall 210 may also be torus-shaped and include a 316 stainless steel shell with thickness of approximately 2 cm (although other thicknesses are possible). The outer wall 210 may surround the intermediate wall 208 to form an outer cavity 216. The outer cavity 216 may also be referred to as a "cold blanket" because the outer cavity 216 may contain FLiBe coolant that has yet to receive heat generated by the plasma within the confinement chamber 202.

The confinement system 200 and/or the confinement chamber 202 may exhibit rotational symmetry and/or translational symmetry with respect to the vertical axis 218. Also, the confinement system 200 and/or the confinement chamber 202 may exhibit rotational symmetry and/or translational symmetry with respect to the horizontal axis 220.

The inlet pipes 222A and 222B may be configured to circulate coolant throughout various areas of the plasma confinement system 200. For example, the inlet pipe 222A may be configured to carry coolant from outside the plasma confinement system 200 into the outer cavity 216. Other pipe sections (shown in FIGS. 6 and 7) of the plasma confinement system 200 may be configured to carry coolant from the outer cavity 216 toward the inner wall 206 so that the coolant may receive heat from the plasma within the confinement chamber 202. The plasma confinement system 200 may include other inlet pipes similar to the inlet pipes 222A and 222B located at various toroidal and/or poloidal positions along the outer wall 210.

The outlet pipes 224A and 224B may also be configured to circulate coolant (e.g., FLiBe or Pb—Li) throughout various areas of the plasma confinement system 200. For example, the outlet pipe 224A may be configured to carry coolant heated by the plasma from the inner cavity 214 to a secondary power conversion cycle so that the heat absorbed from the plasma may be converted to other forms of energy (e.g., electrical energy). The plasma confinement system 200 may include other outlet pipes similar to the outlet pipes 224A and 224B located at various toroidal and/or poloidal positions along the intermediate wall 208.

The neutron shield 226 may encircle the structural shell 229 of the plasma confinement system 200 along a plane that includes the horizontal axis 220 and is perpendicular to the vertical axis 218. The neutron shield 226 may be located between the conductor 230E and respective enclosures of the helicity injectors 242C and 242F. The neutron shield 226 may include a ring-shaped portion of zirconium hydride ($ZrH_2$) that may prevent energetic neutrons produced by nuclear reactions occurring within the plasma from reaching the conductor 230E by passing through a region of the plasma confinement system 200 that includes a helicity injector (e.g., the helicity injectors 242C or 242F). The neutron shield 226 may have a radial thickness larger than that of the neutron shielding layer 228.

The neutron shielding layer 228 may be torus-shaped and perhaps have a radial thickness of approximately 10.5 cm, surrounding the outer wall 210. The neutron shielding layer 228 may be made of zirconium hydride and function to prevent energetic neutrons produced by nuclear reactions occurring within the plasma confinement chamber 202 from reaching the conductors 230A-E or 231A-D.

The structural shell 229 may include a stainless steel layer perhaps having a radial thickness of approximately 7.5 cm surrounding the neutron shielding layer 228. The structural shell 229 may serve to maintain a coolant pressure within the inner cavity 214 and the outer cavity 216, and also to maintain a pressure differential between the plasma confinement chamber 202 and the surrounding atmosphere. For example, the structural shell 229 may maintain a coolant pressure of approximately 0.86 MPa within the outer cavity 216 (i.e. the "cold blanket") tending to cause the coolant within the outer cavity 216 to flow toward the inner wall 206 (see FIG. 6 and accompanying text below).

The plasma confinement system 200 may further include the conductors 230A-F and 231A-D, which may each have an annular shape. (In other examples, the conductors 230A-F and 231A-D may take on shapes other than an annular shape.) The conductors 230A-F and 231A-D may include bulk portions of conductive material or alternatively windings of conductive wire. In some examples, one or more of the conductors 230A-E and 231A-D may include one or both of non-superconductive materials (e.g., stainless steel or copper) and superconductive materials (e.g., yttrium barium copper oxide) while the conductor 230F may be composed solely of non-superconductive materials. The conductors 230A-F and 231A-D may be arranged external to the confinement chamber 202, aligned substantially parallel to the outer radius of the confinement chamber 202 (or, in another sense, parallel to the horizontal axis 220 and perpendicular to the vertical axis 218), and centered upon the vertical axis 218. The conductors 230A-F and 231A-D may be configured to carry currents that circulate about the vertical axis 218, inducing magnetic fields that cause the plasma within the confinement chamber 202 to maintain a substantially circular poloidal cross section and to maintain a minimum distance from the inner wall 206. The conductors 230A-E and 231A-D may include a material that is superconductive at relatively high temperatures (e.g., 81 K) such as yttrium barium copper oxide, or materials that are superconductive at lower temperatures such as niobium-tin or niobium-titanium. The use of superconductive materials may allow much of the energy used to generate the currents provided to the conductors to be coupled into the plasma instead of lost as resistive heat.

In the example of FIG. 2A, the conductors 230A-B may be located above the confinement chamber 202 whereas the conductors 230C-D may be located between the conductors 230A-B and the conductors 230E-F in the poloidal direction. The conductors 230E-F may be located within a plane that (i) includes the outer radius of the plasma confinement chamber 202 and the horizontal axis 220 and (ii) is perpendicular to the vertical axis 218. The conductors 231A-B may be located below the confinement chamber 202 whereas the conductors 231C-D may be located between the conductors 231A-B and the conductors 230E-F in the poloidal direction. The conductors 230A-E and 231A-D may be located external to the structural shell 229, whereas the conductor 230F may be located inside the structural shell 229 within the inner cavity 214 and/or the outer cavity 216.

The conductor 230F may have a specialized purpose of deflecting magnetic fields generated by the conductors 230A-E and 231A-D away from one or more helicity injectors located at the outer radius of the plasma confinement chamber 202. (In another sense, the conductor 230F may carry a current generating a magnetic field that, near one or more helicity injectors, substantially cancels the fields generated by the conductors 230A-E and 231A-D.) The conductor 230F may comprise one or more conductive portions located adjacently above enclosures of the one or more helicity injectors such as the helicity injectors 242F and 242C. The conductor 230F may also comprise one or more portions located adjacently below one or more enclosures of the helicity injectors such as the helicity injectors 242F and 242C. In this way the conductor 230F may surround the one or more helicity injectors to be in a position to deflect or cancel magnetic flux generated by the conductors 230A-E and 231A-D.

The gas inlet pipe(s) 232 may be configured to carry a working gas into the plasma confinement chamber 202, such as a gas including one or more of hydrogen, deuterium, tritium, and helium. The working gas may include constituents of a thermonuclear fusion reaction that generates heat that can be used to generate electrical energy. As shown in FIG. 2A, the gas inlet pipe(s) 232 may insert the working gas at a center area 233 of the plasma confinement chamber 202 (e.g., near an intersection of the vertical axis 218 and the horizontal axis 220). Inserting the working gas at the center area 233 may allow the working gas to diffuse radially outward from the gas inlet pipe(s) 232 to sustain thermonuclear fusion.

Figure 2B:
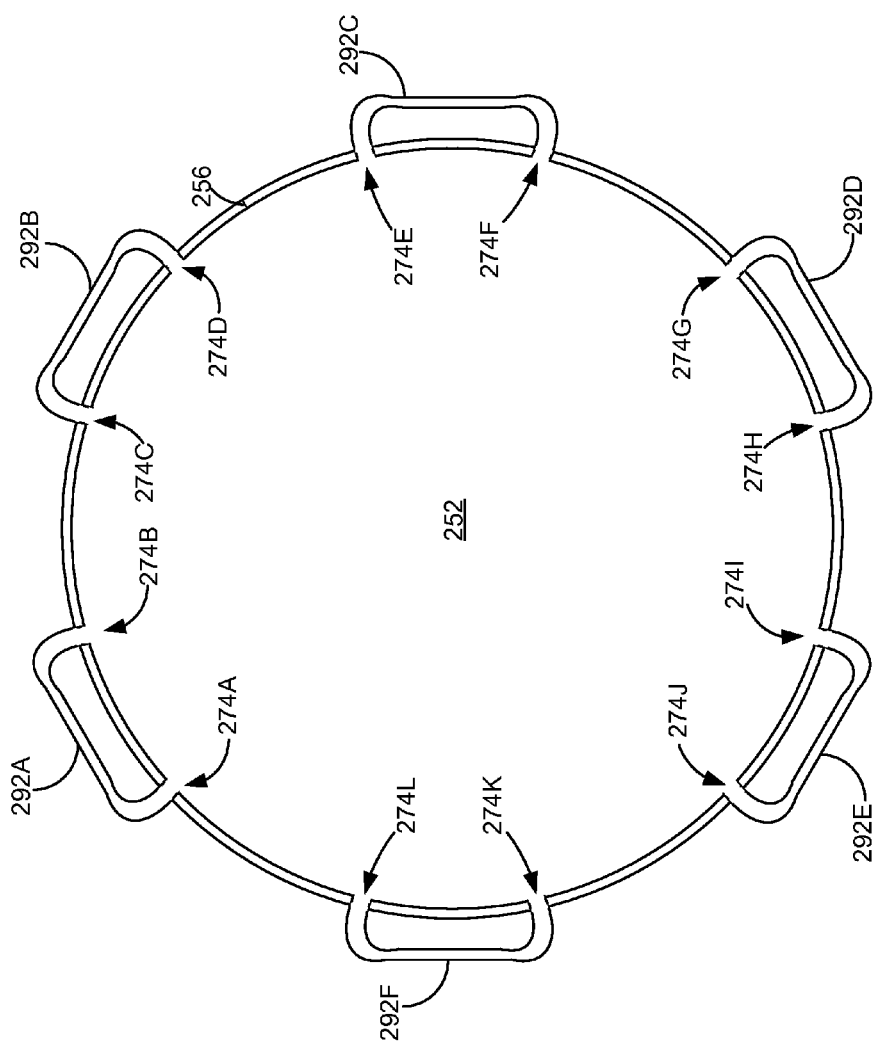
FIG. 2B is a downward view cross-section of an example plasma confinement chamber at an outer radius of the plasma confinement chamber.

FIG. 2B is a downward view cross-section of an example plasma confinement chamber 252 at an outer radius of the plasma confinement chamber 252. The plasma confinement chamber 252 includes an inner wall 256, ports 274A, 274B, 274C, 274D, 274E, 274F, 274G, 274H, 274I, 274J, 274K, and 274L, and tubular enclosures 292A, 292B, 292C, 292D, 292E, and 292F.

The inner wall 256 may form, at least in part, an inner boundary of the plasma confinement chamber 252 suitable for maintaining a pressure differential between the plasma confinement chamber 252 and a surrounding atmosphere. FIG. 2B depicts a cross-section of the plasma confinement chamber 252 at a plane that includes a horizontal axis of the confinement chamber 252 and is perpendicular to a vertical axis of the confinement chamber 252. (See, for example, the vertical axis 218 and the horizontal axis 220 depicted in FIG. 2A.) The outer radius of the confinement chamber 252 may be located at a distal portion of the inner wall 256 within the plane that includes the horizontal axis and is perpendicular to the vertical axis of the confinement chamber 252.

The tubular enclosures 292A-F may be made of metal (e.g., copper) or other materials welded or otherwise respectively coupled to the ports 274A-L of the confinement chamber 252. The tubular enclosures 292A-F may be components of respective helicity injectors. For example, a first end of the tubular enclosure 292A may be coupled to the confinement chamber 252 at the port 274A and a second end of the tubular enclosure 292A may be coupled to the confinement chamber 252 at the port 274B. The tubular enclosures 292A-F may be aligned substantially parallel to the outer radius of the confinement chamber 252. Also, the tubular enclosures 292A-F and/or the ports 274A-L may be spaced symmetrically around the outer radius of the confinement chamber 252. For example, the tubular enclosures 292A-F may be arranged at approximately sixty degree intervals around the outer radius of the confinement chamber 252 and coupled to the confinement chamber 202 at the outer radius.

FIG. 3 shows an example helicity injector 342. FIG. 3 also includes a plasma confinement chamber, an inner wall 306, a tubular enclosure 332, a first conductive coil 334, and a second conductive coil 336. As shown, the tubular enclosure 332 may be coupled to the inner wall 306 at first and second ports 324A and 324B. (Only a portion of the inner wall 306 is shown in FIG. 3 for ease of illustration.)

The first conductive coil 334 may be disposed between the tubular enclosure 332 and the inner wall 306 of the plasma confinement chamber 302. As shown, the first conductive coil 334 may be aligned substantially parallel with the tubular enclosure 332 and an outer radius of the plasma confinement chamber 302. Aligned in this way, a current may be provided to terminals (not shown) of the first conductive coil 334 via a power source (e.g., controller 130 of FIG. 1) and the current carried by the first conductive coil 334 may generate an electric field within the tubular enclosure 332 that is aligned with a longitudinal axis of the tubular enclosure 332. The electric field may induce or maintain a plasma within the plasma confinement chamber 302 and cause charge carriers (e.g. ions or electrons) to move along field lines of the electric field. For example, charge carriers may travel from the plasma confinement chamber 302 into a first end 333 of the tubular enclosure 332 and exit at a second end 335 of the tubular enclosure 332 back into the plasma confinement chamber 302. A plasma confinement system may include one or more helicity injectors 342 each including a respective first conductive coil 334 as shown in FIG. 3.

The second conductive coil 336 may be wound around or otherwise surround a longitudinal portion of the tubular enclosure 332. Positioned in this way, a current may be provided to terminals (not shown) of the second conductive coil 336 via a power source (e.g., the controller 130 of FIG. 1) and the current carried by the second conductive coil 336 may generate a magnetic field within the tubular enclosure 332 that is aligned with the longitudinal axis of the tubular enclosure 332. The magnetic field may cause charge carriers (e.g. ions or electrons) to travel helically along the electric field lines generated by the first conductive coil 334 and around magnetic field lines of the magnetic field. A plasma confinement system may include one or more helicity injectors 342 each including a respective second conductive coil 336 as shown in FIG. 3.

Figure 4:
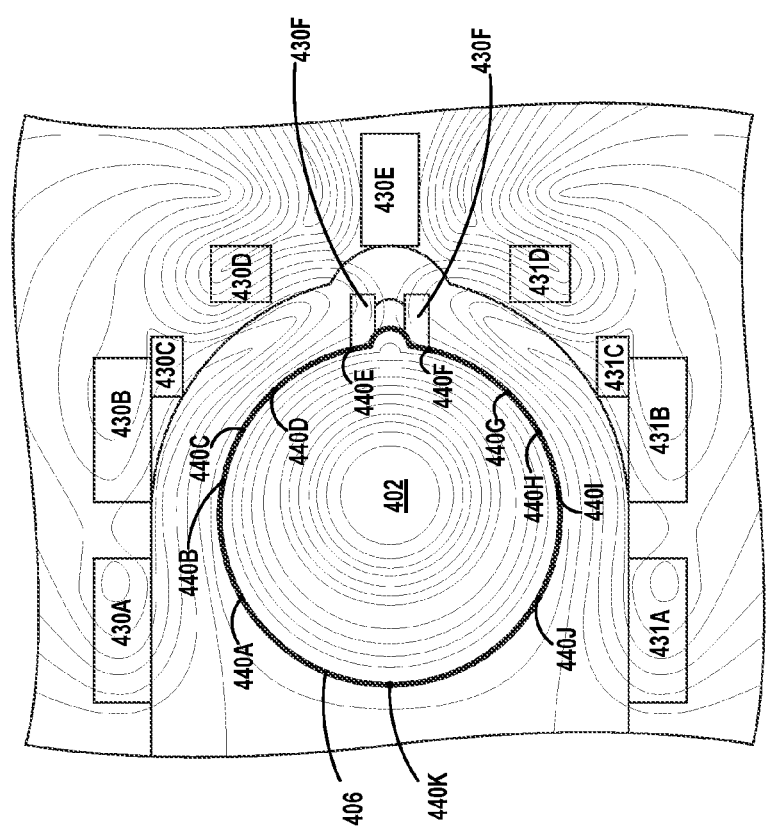
FIG. 4 is a partial side view cross-section of an example plasma confinement system.

FIG. 4 is a partial side view cross-section of an example plasma confinement system. FIG. 4 also includes a plasma confinement chamber 402, an inner wall 406, conductors 430A, 430B, 430C, 430D, 430E, 430F, 431A, 431B, 431C, and 431D, and sensors 440A, 440B, 440C, 440D, 440E, 440F, 440G, 440H, 4401, 440J, and 440K.

Within the plasma confinement chamber 402, the sensors 440A-K are spread out in a poloidal direction on the inner wall 406. The sensors 440A-K may be magnetic field sensors configured to detect magnetic flux at various locations along the inner wall 406. Although the sensors 440A-K are shown as being located within a single poloidal cross section of the inner wall 406, other sensors may be located at other poloidal cross sections (i.e., toroidal locations) as well. The sensors 440A-K may be electrically coupled to a controller and configured to sense magnetic flux density by detecting a force applied by a magnetic field to a conductor carrying a test current, or by measuring a change in a mechanical resonance frequency of a structure caused by strain induced by the magnetic field, among other methods.

The currents respectively provided to the conductors 430A-F and 431A-D may be feedback-controlled (e.g., by the controller 130 of FIG. 1) based on the magnetic flux densities detected by the sensors 440A-K. As shown in FIG. 4, the magnetic field lines generated by the conductors 430A-F and 431A-D within the confinement chamber 402 may cause charge carriers of a plasma within the confinement chamber 402 to circulate in a poloidal direction and follow a substantially circular poloidal path. While the plasma is circulating in the poloidal direction, the plasma may also move in the toroidal direction as well. This may result in a stable plasma (e.g. a kink-stable plasma) suitable for causing sustainable thermonuclear fusion reactions within the plasma. For example, magnetic fluctuations within the plasma caused by magnetic fields induced by the helicity injectors 292A-F and/or the conductors 430A-F and 431A-D may enable sustainment of a kink-stable plasma equilibrium because plasma instabilities are not needed to drive a plasma current (unlike other plasma confinement methods or systems). That is, the plasma may be controlled via helicity injectors 292A-F and/or the conductors 430A-F and 431A-D instead of relying on confinement degrading kink-mode instabilities of the plasma to sustain the plasma current.

As depicted in Table 1, providing the following average currents to the respective conductors 430A-F and 431A-D may generate the highly stable plasma that is maintained a minimum distance from the inner wall 406. It should also be noted that the current carried by the conductor 430F largely serves to deflect or (cancel via superposition) much of the magnetic flux that would otherwise be generated near a helicity injector surrounded by the conductor 430F. (As an example, 100 MA-turns is equivalent to a wire carrying 10 MA being wound about the vertical axis 10 times, or a wire carrying 100 MA being wound about the vertical axis once.)

TABLE 1

| Conductor 430A | −16.3 MA-turns |
| Conductor 430B | −5.2 MA-turns |
| Conductor 430C | −0.4 MA-turns |
| Conductor 430D | −11 MA-turns |
| Conductor 430E | 16.8 MA-turns |
| Conductor 430F | 2.6 MA-turns (on each portion above and below helicity injectors) |
| Conductor 431A | −16.3 MA-turns |
| Conductor 431B | −5.2 MA-turns |
| Conductor 431C | −0.4 MA-turns |
| Conductor 431D | −11 MA-turns |

Figure 5B:
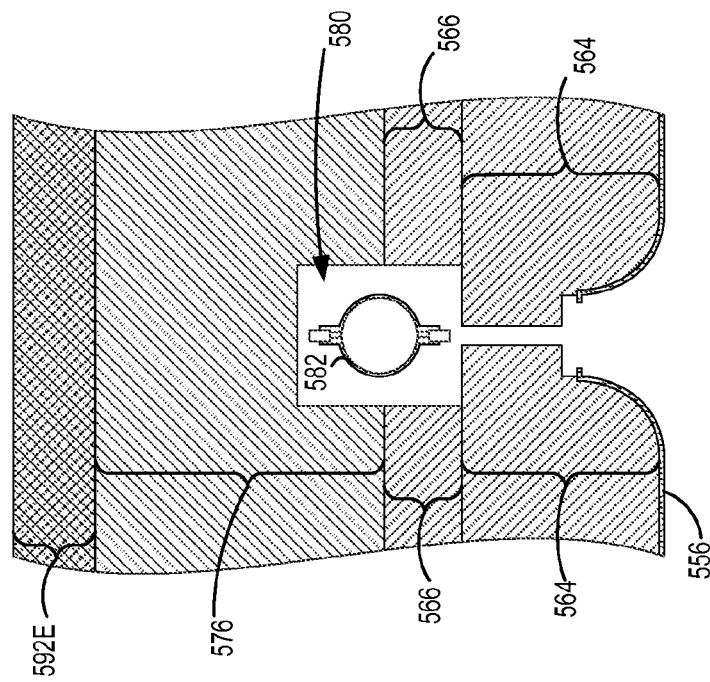
FIG. 5B is a partial side view cross-section of an example plasma confinement system near a helicity injector.
Figure 5A:
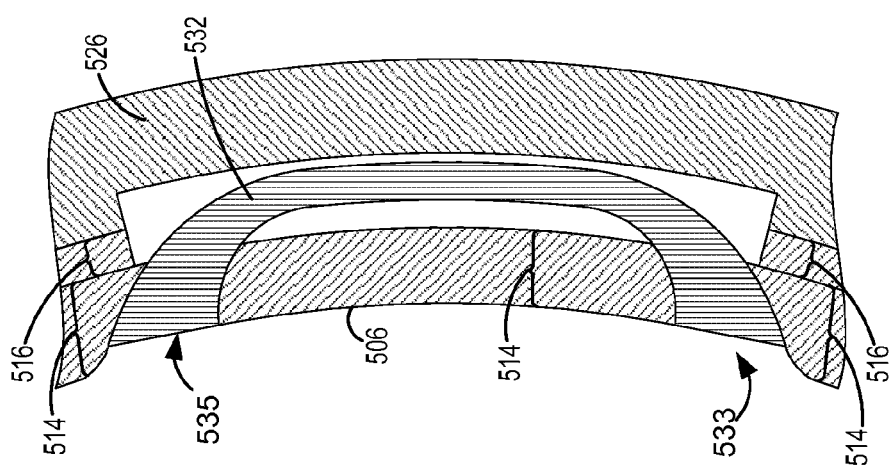
FIG. 5A is a close-up downward view cross-section of an example plasma confinement system near a helicity injector.

FIG. 5A is a close-up downward view cross-section of an example plasma confinement system near a helicity injector 532. FIG. 5A also includes an inner wall 506, an inner cavity 514, an outer cavity 516, a neutron shield 526.

The inner wall 506 may be similar to the inner wall 206 of FIG. 2A or the inner wall 256 of FIG. 2B. As shown in FIG. 5A, ends of a tubular enclosure of the helicity injector 532 respectively pass through the inner cavity 516 and have flush terminations 533 and 535 at the inner wall 506. In this example, a section of the inner wall 506 between the ends of the helicity injector 532 may be recessed from a remainder portion of the inner wall 506, however other layouts of the inner wall 506 are possible. The helicity injector 532 may include first and second conductive coils that are not shown in FIG. 5A, for ease of illustration. Example conductive coils include conductive coils 334 and 336 of FIG. 3. The neutron shield 526 may be located radially outward from the helicity injector 532 so that energetic neutrons generated by the plasma within the confinement chamber may be prevented from reaching a conductor such as conductor 230E of FIG. 2A.

FIG. 5B is a partial side view cross-section of an example plasma confinement system. FIG. 5B also includes an inner wall 556, an inner cavity 564, an outer cavity 566, a neutron shield 576, a helicity injector 582, and a conductor 592E. The inner cavity 564, the outer cavity 566, and the neutron shield 576 may form a collective cavity 580 that houses the helicity injector 582. As shown in FIG. 5B, the neutron shield 576 may protect the conductor 592E from energetic neutrons generated in the plasma contained within a plasma confinement chamber (below the inner wall 556 as pictured in FIG. 5B). The conductor 592E may be positioned similarly to the conductor 230E of FIG. 2A (i.e., parallel to an outer radius of the confinement chamber).

Figure 6:
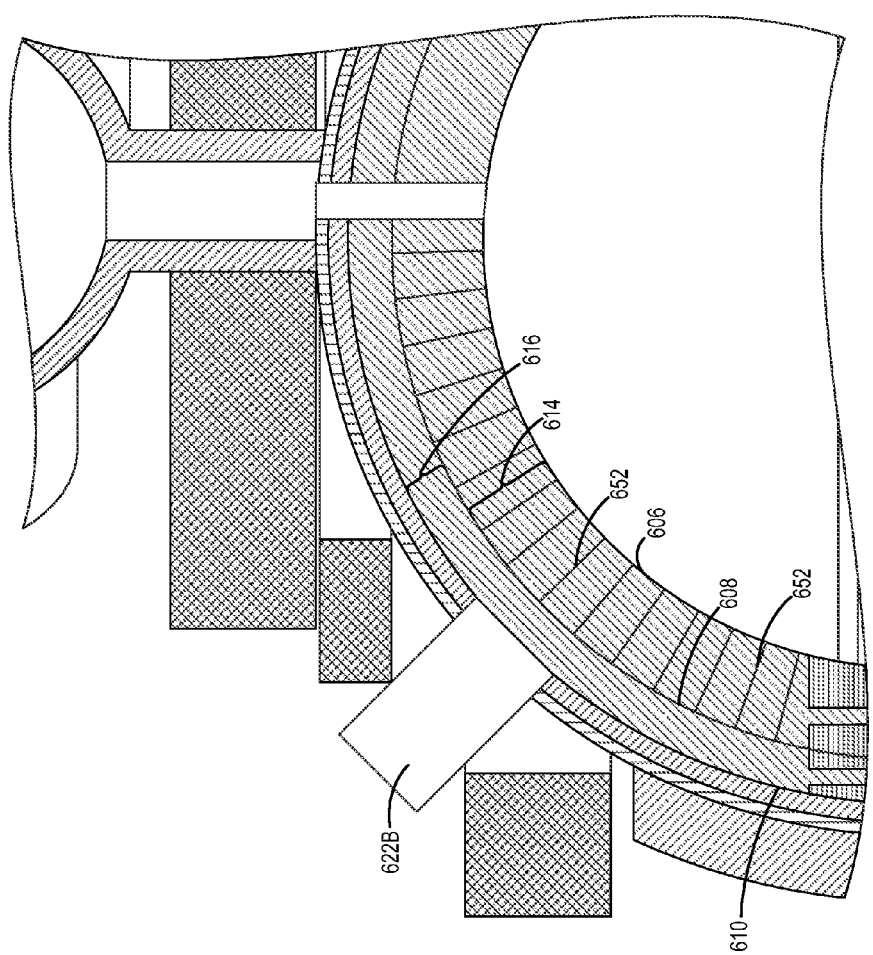
FIG. 6 is a partial side view cross-section of an example heat-exchange system of a plasma confinement system.

FIG. 6 is a partial side view cross-section of an example heat-exchange system of a plasma confinement system. The heat-exchange system 600 includes an inner wall 606, an intermediate wall 608, an outer wall 610, an inner cavity 614, an outer cavity 616, an inlet pipe 622B, and at least one pipe section 652.

A proximal end of the inlet pipe 622B may be coupled to the outer cavity 616 at the outer wall 610 and coolant (e.g., FLiBe) may be flowed from outside the plasma confinement system into the outer cavity 616 through the inlet pipe 622B. Next, a pressure gradient may direct the coolant to flow from the outer cavity 616 into one of the pipe sections 652.

The pipe sections 652 may be respectively coupled to the outer cavity 616 at first ends of the pipe sections 652 and be aligned to carry coolant radially inward toward the inner wall 606 from the outer cavity 616. (Various pipe sections of this disclosure may be made of metal (e.g., copper) or other materials suitable for directing coolant flow.) The pipe sections 652 may be aligned along respective minor radii of the torus-shaped confinement chamber. In this example, the pipe sections 652 span the inner cavity 614 but do not divide the inner cavity 614 into separated compartments. Although FIG. 6 shows only a partial poloidal cross section of the heat-exchange system, the pipe sections 652 may be located at various toroidal and poloidal positions throughout the plasma confinement system.

Once the coolant approaches the inner wall 606 after flowing through a pipe section 652, the coolant may flow through one of several pipe sections (not shown) that are aligned toroidally along the inner wall 606. The pipe sections that are aligned along the inner wall 606 may be coupled to respective second ends of the pipe sections 652 at respective first ends of the pipe sections that are aligned along the inner wall 606 (see FIG. 7). As the coolant flows through one or more of the pipe sections aligned along the inner wall 606, the coolant may receive heat generated by the plasma within the plasma confinement system. The path of coolant flow through the heat-exchange system is further described below with reference to FIG. 7.

Figure 7:
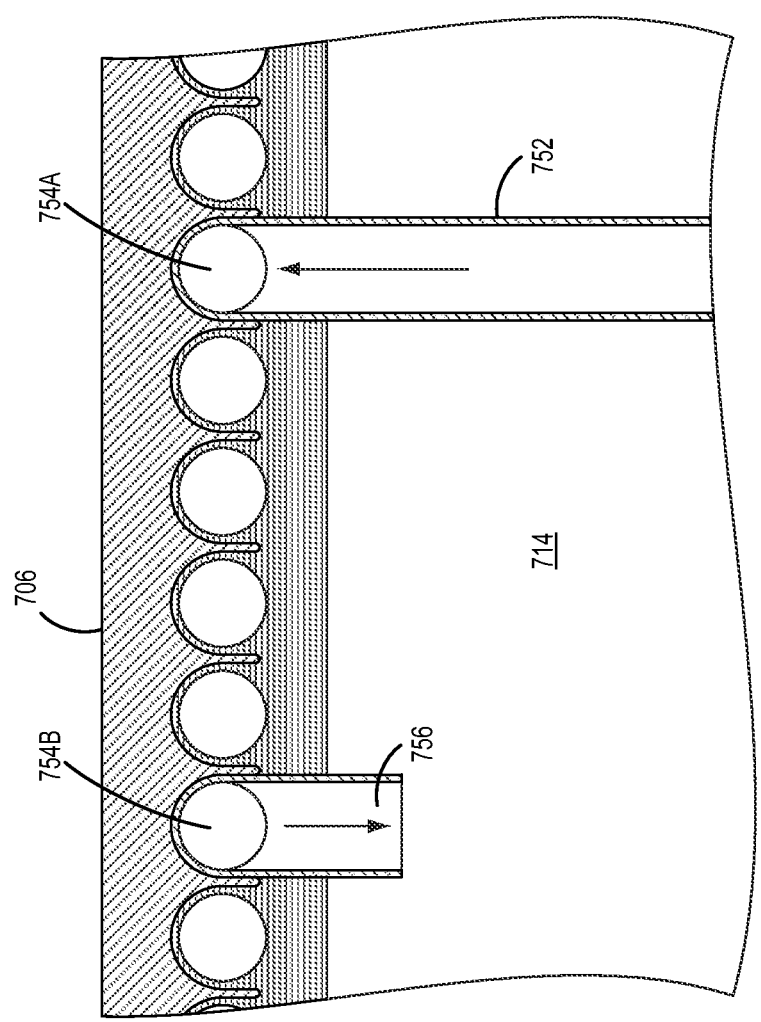
FIG. 7 is a close-up partial side view cross-section of an example heat-exchange system of a plasma confinement system.

FIG. 7 is a close-up partial side view cross-section of an example heat-exchange system of a plasma confinement system. FIG. 7 includes an inner wall 706, an inner cavity 714, and pipe sections 752, 754A, 754B, and 756. In FIG. 7, the inner wall 706 is depicted with a substantially flat surface for ease of illustration, however, the inner wall 706 may have a curved surface consistent with the shape of a torus-shaped plasma confinement chamber (e.g., the plasma confinement chamber 202).

Coolant may flow from an outer cavity (e.g. outer cavity 616 of FIG. 6) toward the inner wall 706 through a pipe section 752 in a radially inward direction. Upon nearing the inner wall 706, the coolant flow may continue in a toroidal direction through the pipe section 754A which may be coupled to a proximal end of the pipe section 752 at a first end of the pipe section 754A. Various pipe sections (e.g., 754A and 754B) that are aligned against or adjacent to the inner wall 706 may have respective lengths of approximately 4.3 m. The coolant may be pressurized to flow through various pipe sections adjacent to the inner wall 706 (e.g., 754A and 754B) at a velocity of approximately 8 m/s. Once the coolant has flowed through the pipe section 754A, the coolant may be redirected radially outward into the inner cavity 714 through a pipe section (not shown) similar to pipe section 756. The pipe section coupling pipe section 754A and the inner cavity 714 may be located behind the pipe section 752 at the same poloidal position as the pipe section 752 and may be coupled at first (proximal) end to a second end of the pipe section 754A.

As another example, pipe section 754B may be similar to pipe section 754A in that the pipe section 754B may be coupled, at a first end of the pipe section 754B, to a radially proximal end of a pipe section that carries coolant inward toward the inner wall 706 (similar to the pipe section 752). The pipe section 754B may be coupled to a first end of the pipe section 756 at a second end of the pipe section 754B. After flowing through the pipe sections 754B and 756 into the inner cavity 714, the coolant may flow away from the plasma confinement chamber through an outlet pipe (e.g., outlet pipe 224B) that is coupled to the inner cavity 714. In some instances the coolant may flow in at least a partially poloidal direction within the inner cavity before reaching the outlet pipe.

Figure 8:
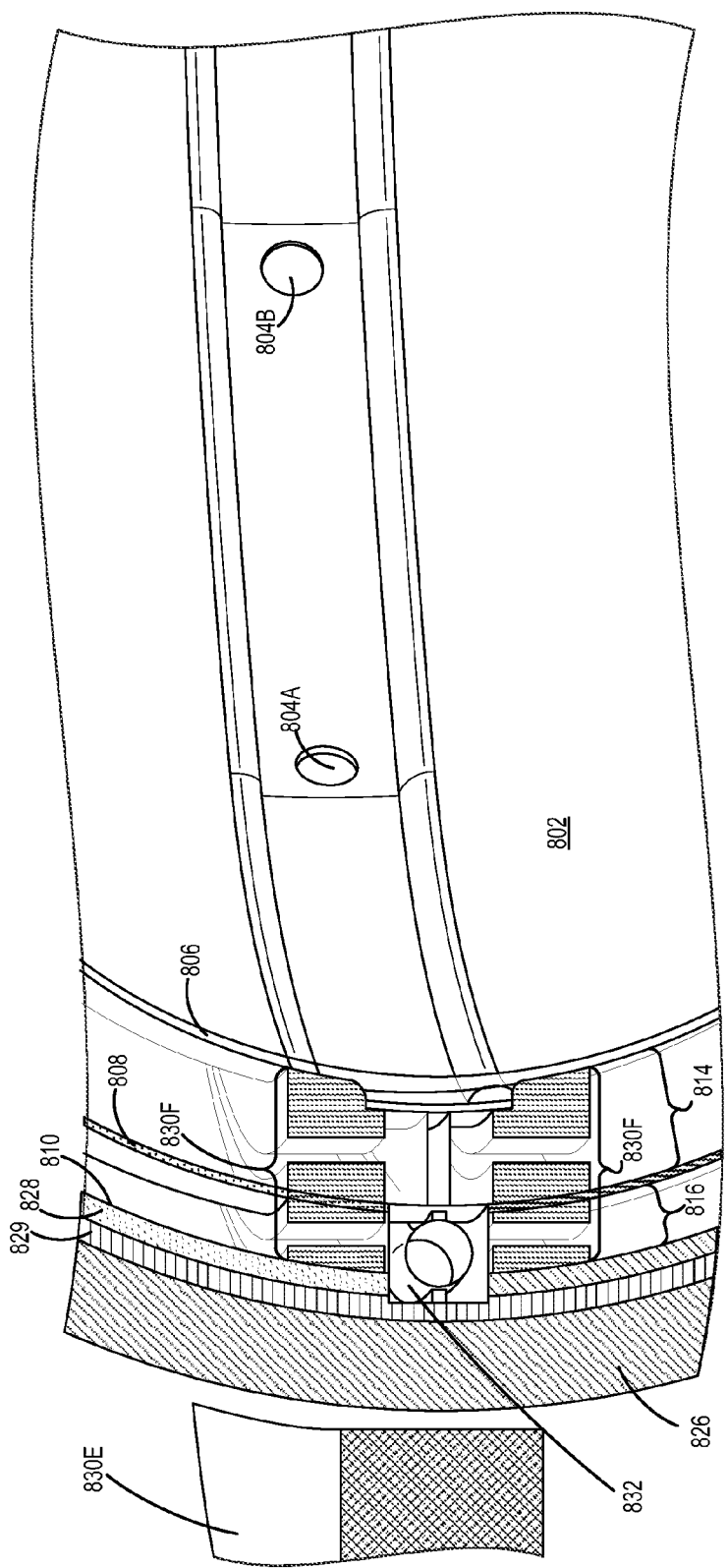
FIG. 8 is a close-up partial side view cross-section of an example plasma confinement system.

FIG. 8 is a close-up partial side view cross-section of an example plasma confinement system, including ports 804A and 804B, an inner wall 806, an intermediate wall 808, an outer wall 810, an inner cavity 814, an outer cavity 816, a neutron shield 826, and conductors 830E and 830F.

The ports 804A and 804B may form interfaces at the inner wall 806 for respective ends of a tubular enclosure of a helicity injector to couple to. As shown in FIG. 8, various portions of the conductor 830F may be positioned adjacently above or adjacently below the helicity injector 832. Various portions of the conductor 830F may also be positioned within the inner cavity 814 or the outer cavity 816. The neutron shield 826 shields the conductor 830E from energetic neutrons that may otherwise reach the conductor 830E from the plasma confinement chamber 802.

Figure 9:
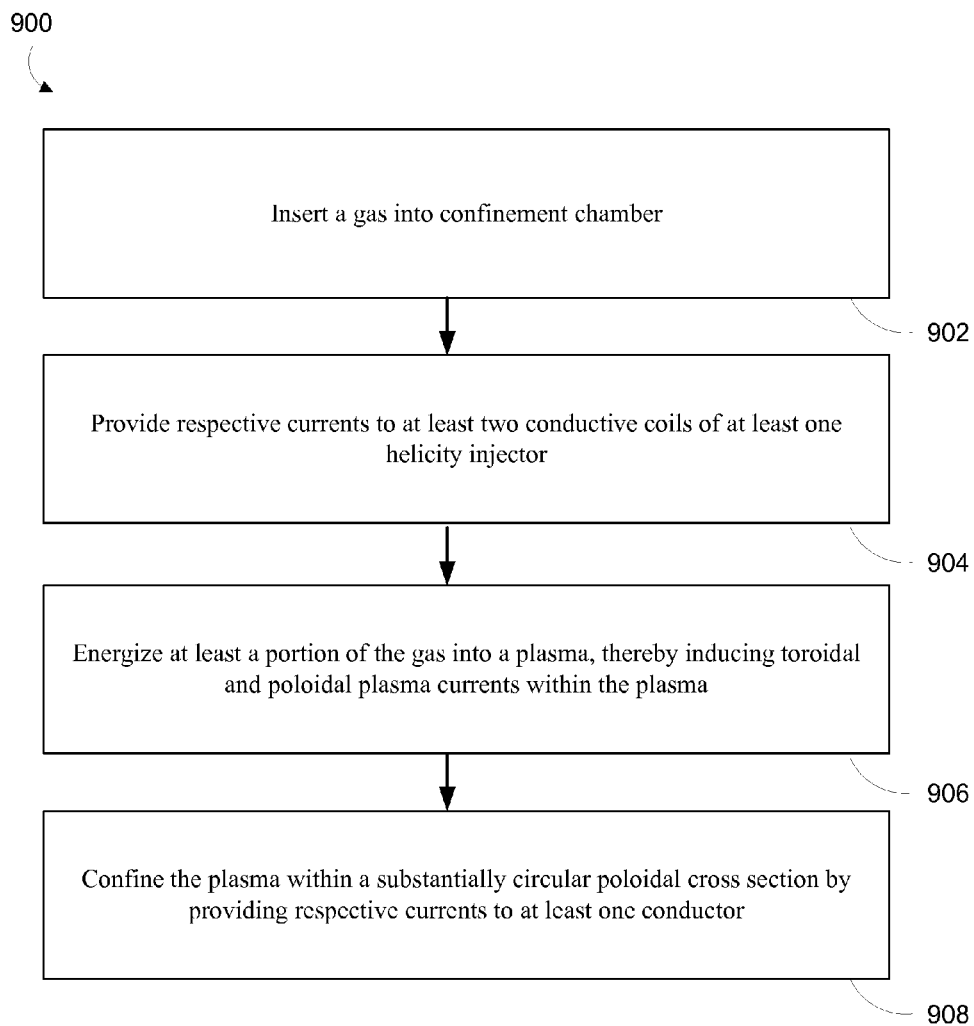
FIG. 9 is a block diagram depicting an example method.

FIG. 9 is a block diagram depicting an example method 900 of maintaining a plasma in a confinement chamber. At block 902, the method 900 includes inserting a gas into the confinement chamber. Referring to FIG. 1 for an example, the controller 130 may cause the gas insertion valves 142 and 144 to respectively cause a working gas stored in one or more pressurized vessels to flow into the confinement chamber 110 and/or the tubular enclosure 124. The working gas may include at least one of hydrogen, deuterium, tritium and helium making up constituents of a thermonuclear reaction that may occur within the confinement chamber.

At block 904, the method 900 includes providing respective currents to at least two conductive coils of at least one helicity injector. The at least one helicity injector is coupled to the confinement chamber at an outer radius of the confinement chamber. Referring to FIG. 3, the controller 130 (of FIG. 1) may provide respective currents to the conductive coil 334 and the conductive coil 336 of the helicity injector 342. As shown respectively in FIGS. 2A and 2B, helicity injectors such as helicity injectors 242C, 242F, and 292A-F may be coupled to the confinement chamber at the outer radius of the confinement chamber.

At block 906, the method 900 includes energizing at least a portion of the gas into a plasma, thereby inducing toroidal and poloidal plasma currents within the plasma. The plasma currents may be induced by electric and magnetic fields generated by the currents provided to the conductive coils of the at least one helicity injector. For example, an electric field may be generated by a conductive coil such as the conductive coil 334 of FIG. 3. Also, a conductive coil such as the conductive coil 336 may generate a magnetic field. The electric and magnetic fields may be aligned with a longitudinal axis of the helicity injector (e.g., helicity injector 274A of FIG. 2B) so that plasma currents that are aligned with the helicity injectors are inserted into the confinement chamber.

At block 908, the method 900 includes confining the plasma within a substantially circular poloidal cross section by providing respective currents to at least one conductor that is (i) external to the confinement chamber, (ii) aligned substantially parallel to the outer radius, and (iii) centered upon a vertical axis of the confinement chamber that is perpendicular to the outer radius. The respective currents may be provided to the conductors by the controller 130 of FIG. 1, for example. Referring to FIG. 4, the currents provided to the conductors 430A-F and 431A-D generate a magnetic field that confines the plasma within a substantially circular poloidal cross section. The conductors could be arranged as shown in FIG. 2A. For example, The conductors 230A-F and 231A-D are (i) external to the confinement chamber 202, (ii) aligned substantially parallel to the outer radius (e.g., parallel to the horizontal axis 220 and perpendicular to the vertical axis 218), and (iii) centered upon the vertical axis 218 of the confinement chamber 202, the vertical axis 218 being perpendicular to the outer radius. In some embodiments, the plasma may be a kink-stable plasma where instabilities that may materialize within the plasma may dissipate instead of grow stronger.

The method 900 may also include detecting a distance of the plasma from an inner wall of the confinement chamber, and based on the detected distance, providing the respective currents to the at least one conductor so that the plasma is kept a minimum distance from the inner wall. For example, sensors 440A-K may respectively detect the distance of a plasma from the inner wall 406 and provide, to the controller 130 of FIG. 1, signals representing distances of the plasma from the respective sensors 440A-K. The controller 130 may then adjust respective currents provided to the conductors 430A-F and 431A-D maintain respective minimum distances between the plasma and the inner wall 406. For example, adjusting the current provided to the conductor 430A may be useful to deflect the plasma away from the inner wall 406 near sensors 440A and 440B. Adjusting the current provided to the conductor 430A may also be useful to allow the plasma closer to the sensors 440A and 440B, if desired.

The method 900 may also include providing a current to a first conductor that deflects magnetic flux generated by a second conductor away from at least one helicity injector. As shown in FIG. 4 for example, a current is provided to the one or more conductors 430F that deflects (or cancels via superposition) magnetic field lines generated by the conductors 430A-E and 431A-D. A current waveform provided to the conductor 430F that causes such a deflection may be dependent upon currents provided to the other conductors 430A-E and 431A-D and may be listed in Table 1 above.

The method 900 may also include flowing a coolant (e.g., FLiBe) through a heat-exchange system configured to remove heat from the confinement chamber. The method may further include (i) flowing coolant inward, perhaps along a minor radius of the confinement chamber, through an inlet pipe and into an outer cavity of the heat-exchange system; (ii) flowing the coolant inward, perhaps along a minor radius of the confinement chamber, from the outer cavity through a first pipe section toward an inner wall of the confinement chamber; (iii) at the inner wall, flowing the coolant in at least a partially toroidal direction through a second pipe section, causing the coolant to receive heat from the inner wall of the confinement chamber; (iv) flowing the coolant outward, perhaps along a minor radius of the confinement chamber, from the second pipe section through a third pipe section and into an inner cavity of the heat-exchange system; and (v) flowing the coolant out of the inner cavity through an outlet pipe. In some instances the coolant may flow in at least a partially poloidal direction within the inner cavity to reach the outlet pipe. See FIGS. 6 and 7 and accompanying text above for more details about the method for flowing coolant through the heat-exchange system.

The method 900 may further include providing respective current waveforms that are mutually out of phase to at least first and second helicity injectors. For example, respective conductive coils of the helicity injectors of FIG. 2B may be provided the currents provided in Table 2. (Example conductive coils of a helicity injector are shown in FIG. 3.)

TABLE 2

| Helicity Injector | Helicity Injector Current Waveform |
|---|---|
| 292A | $I_1 = I_0 \cos(\omega_i t) [1 - A\cos(\omega_r t)]$ |
| 292B | $I_2 = I_0 \sin(\omega_i t) [1 - A\cos(\omega_r t)]$ |
| 292C | $I_3 = I_0 \cos(\omega_i t) [1 - A\cos(\omega_r t + 2\pi/3)]$ |
| 292D | $I_4 = I_0 \sin(\omega_i t) [1 - A\cos(\omega_r t + 2\pi/3)]$ |
| 292E | $I_5 = I_0 \cos(\omega_i t) [1 - A\cos(\omega_r t + 4\pi/3)]$ |
| 292F | $I_6 = I_0 \sin(\omega_i t) [1 - A\cos(\omega_r t + 4\pi/3]$ |

Referring to Table 2 and FIG. 2B, a first conductive coil (e.g., conductive coil 334 of FIG. 3) of the helicity injector 292A may be provided a current having a waveform $I_1=I_0 \cos(\omega_i t) [1-A \cos(\omega_r t)]$. $I_0$ may be a constant with units of amperes, $\omega_i$ may be the oscillation frequency of the current waveform, A may be a unitless optimization constant, and $\omega_r$ may be the rotation frequency of the bulk plasma within the confinement chamber. As shown in Table 2, the current waveforms provided to respective first conductive coils of the helicity injectors 292A and 292B are $\pi/2$ radians out of phase. On the other hand, the currents provided to respective first conductive coils of the helicity injectors 292A and 292C are in phase. It should be noted that respective current waveforms provided to second conductive coils (e.g., conductive coil 336 of FIG. 3) of the helicity injectors 292A-292F may be respectively in phase with the respective currents provided to the first conductive coils of the helicity injectors 292A-292F. That is, each helicity injector may receive a first current waveform for a first conductive coil and a second current waveform for a second conductive coil, with the waveforms being in phase.

It may also be useful to provide amplitude modulation to the currents provided to the helicity injectors 292A-F of FIG. 2B. As shown in Table 2, the current amplitudes provided to respective first conductive coils of the helicity injectors 292A and 292C are $2\pi/3$ radians out of phase. On the other hand, the current amplitudes provided to respective first conductive coils of the helicity injectors 292A and 292B are in phase. It should be noted that respective current amplitudes provided to second conductive coils of the helicity injectors 292A-292F may be respectively in phase with the respective current amplitudes provided to the first conductive coils of the helicity injectors 292A-292F. That is, each helicity injector may receive a first current waveform for a first conductive coil and a second current waveform for a second conductive coil, with the amplitudes of the waveforms being in phase. By providing out of phase current waveforms and/or out of phase current amplitudes to the various helicity injectors 292A-292F, bulk rotation of the plasma may be caused in a toroidal and/or a poloidal direction.

Figure 10:
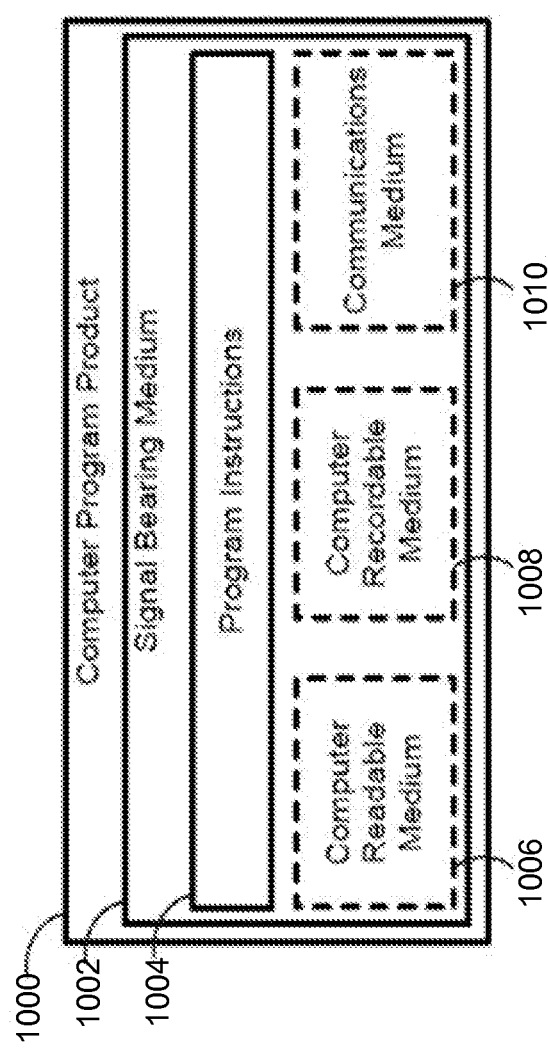
FIG. 10 depicts a computer-readable medium configured according to an example embodiment.

FIG. 10 depicts a computer-readable medium configured according to an example embodiment. In example embodiments, an example system (e.g. controller 130 of FIG. 1) can include one or more processors, one or more forms of memory, one or more input devices/interfaces, one or more output devices/interfaces, and machine-readable instructions that when executed by the one or more processors cause the system to carry out the various methods, functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture (e.g., executable instructions stored on a memory of the controller 130). FIG. 10 is a schematic illustrating a conceptual partial view of an example computer program product that includes a computer program for executing a computer process on a computing device, arranged according to at least some embodiments presented herein.

In one embodiment, the example computer program product 1000 is provided using a signal bearing medium 1002. The signal bearing medium 1002 can include one or more programming instructions 1004 that, when executed by one or more processors can provide functionality or portions of the functionality described above with respect to FIGS. 1-9. In some examples, the signal bearing medium 1002 can be a computer-readable medium 1006, such as, but not limited to, a hard disk drive, a Compact Disc (CD), a Digital Video Disk (DVD), a digital tape, memory, etc. In some implementations, the signal bearing medium 1002 can be a computer recordable medium 1008, such as, but not limited to, memory, read/write (R/W) CDs, R/W DVDs, etc. In some implementations, the signal bearing medium 1002 can be a communications medium 1010, such as, but not limited to, a digital and/or an analog communication medium (e.g., a fiber optic cable, a waveguide, a wired communications link, a wireless communication link, etc.). Thus, for example, the signal bearing medium 1002 can be conveyed by a wireless form of the communications medium 1010.

The one or more programming instructions 1004 can be, for example, computer executable and/or logic implemented instructions. In some examples, a computing device such as the controller 130 of FIG. 1 is configured to provide various operations, functions, or actions in response to the programming instructions 1004 and/or executable instructions conveyed to a processor or processors by one or more of the computer readable medium 1006, the computer recordable medium 1008, and/or the communications medium 1010.

The non-transitory computer readable medium could also be distributed among multiple data storage elements, which can be remotely located from each other. The computing device that executes some or all of the stored instructions can be a handheld device, such as a personal phone, tablet, etc. Alternatively, the computing device that executes some or all of the stored instructions can be another computing device, such as a server.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A plasma confinement system comprising:
    a confinement chamber comprising one or more ports located at an outer radius of the confinement chamber;
    one or more enclosures aligned substantially parallel to the outer radius and each coupled to a respective first port of the one or more ports at a first end of the enclosure and coupled to a respective second port of the one or more ports at a second end of the enclosure;
    a first set of one or more conductive coils respectively located between each of the one or more enclosures and the confinement chamber, wherein the first set of one or more conductive coils are aligned substantially parallel with the one or more enclosures; and
    a second set of one or more conductive coils respectively surrounding a portion of each of the one or more enclosures.

2. The plasma confinement system of claim 1, further comprising at least one conductor comprising a first conductor that is (i) external to the confinement chamber, (ii) aligned substantially parallel to the outer radius, and (iii) centered upon a vertical axis of the confinement chamber that is perpendicular to the outer radius.

3. The plasma confinement system of claim 2, wherein the first conductor is located on a plane containing the outer radius.

4. The plasma confinement system of claim 2, wherein the first conductor comprises:
    a first portion located adjacently above the one or more enclosures; and
    a second portion located adjacently below the one or more enclosures.

5. The plasma confinement system of claim 2, further comprising a neutron shield located between the one or more enclosures and the at least one conductor.

6. The plasma confinement system of claim 2, wherein the at least one conductor comprises a superconducting material.

7. The plasma confinement system of claim 1, further comprising:
    at least one sensor positioned on an inner wall of the confinement chamber; and
    a controller electrically coupled to the at least one sensor.

8. The plasma confinement system of claim 1, wherein the one or more enclosures comprise a plurality of enclosures, wherein each enclosure of the plurality of enclosures are (i) coupled to the confinement chamber at the outer radius and (ii) spaced symmetrically around the outer radius.

\* \* \* \* \*